United States Patent [19]

Grzybowski et al.

[11] Patent Number: 5,711,796
[45] Date of Patent: Jan. 27, 1998

US005711796A

[54] BITUMINOUS COMPOSITIONS HAVING ENHANCED PERFORMANCE PROPERTIES

[75] Inventors: Kenneth Francis Grzybowski, Temple Terrace; David Reese Jones, IV, Tampa, both of Fla.; William Russell Welliver, Ship Bottom, N.J.; Timothy Jay Roth, Allentown, Pa.

[73] Assignee: Air Products and Chemicals, Inc., Allentown, Pa.

[21] Appl. No.: 543,564

[22] Filed: Oct. 16, 1995

[51] Int. Cl.$^6$ .................... C04B 18/06; C08L 95/00
[52] U.S. Cl. .................. 106/281.1; 106/202; 106/277; 106/282; 106/668; 106/671; 208/23
[58] Field of Search ...................... 106/202, 277, 106/281.1, 282, 668, 671; 208/22, 23

[56] References Cited

U.S. PATENT DOCUMENTS

| | | | |
|---|---|---|---|
| 5,217,530 | 6/1993 | Grzybowski | 106/202 |
| 5,236,497 | 8/1993 | Grzybowski | 106/282 |
| 5,340,391 | 8/1994 | Grzybowski | 106/281.1 |
| 5,562,767 | 10/1996 | Miller et al. | 106/668 |

*Primary Examiner*—Glenn Caldarola
*Assistant Examiner*—Bekir L. Yildirim
*Attorney, Agent, or Firm*—Thomas G. Ryder

[57] ABSTRACT

Bituminous compositions of enhanced physical/performance properties comprising an oxidation product of a naturally occurring asphalt from the Orinoco Belt of Venezuela and the bitumen base material, and methods for their preparation.

46 Claims, No Drawings

BITUMINOUS COMPOSITIONS HAVING ENHANCED PERFORMANCE PROPERTIES

BACKGROUND OF THE INVENTION

The present invention relates generally to bituminous compositions characterized by enhanced performance properties, and methods for their preparation, as can be effected through use of an oxidation product of a naturally occurring Orinoco-type asphalt.

Bitumens are a class of amorphous, solid, semi-solid or viscous, cementitious substances, natural or manufactured, composed generally without limitation of high molecular weight hydrocarbons, as typically found in asphalts, tars, pitches and asphaltites. Bituminous materials are typically derived from asphalt or coal tar, with asphalt found naturally or attainable as a by-product of crude oil refining, and coal tar and pitches produced by the destructive distillation of coal. The compositional make up of coal, coal tar pitches, crude oils and natural asphalts vary depending upon the geological origin and/or geographical source. As a result, the physical characteristics of any one bituminous material, whether natural or manufactured, can differ markedly from another. The variety of bitumens give it wide utility in the building and construction industry.

The performance required of any such bituminous material is determined by its end use and/or application and is gauged by one or more measurable properties. A bitumen used in the fabrication of a roofing product can be defined by its softening point, penetration, flash point, viscosity-temperature relationship, among other such performance properties. As another broad application category, a bitumen used in conjunction with paving-related products is often described in terms of penetration, ductility, retained penetration, complex modulus, viscosity grade, aging and other related performance properties. Other recognized bitumen applications also have associated therewith various well-known properties, parameters and/or physical characteristics by which performance can be evaluated.

For illustrative purposes, consider asphalt as a representative bitumen used for building/construction. Asphalt materials used in the roofing context must be designed to perform several somewhat diverse functions. In order to saturate and impregnate an organic or comparable base material, a roofing asphalt must be very fluid at processing temperatures. In addition to saturation, the asphalt must also serve as a medium for various fillers and/or stabilizers, and promote surface adherence of mineral granules. Once applied as part of a roofing material, the asphalt should retain its durability and/or weather resistance over a wide range of temperature extremes. Evaluation of its performance properties determines the suitability of any one asphalt for a given roofing application.

The overall performance of a roofing composition will depend upon the properties of the various components, as well as their interaction and interdependence upon one another. For example and as mentioned above, coating asphalts are often reinforced with a mineral stabilizer/filler such as ground limestone, slate, or traprock. The stabilizer/filler enhances asphalt durability and increases resistance to fire and weathering. Depending upon the specific physical and/or performance requirements, such asphalt materials can be incorporated into any one of a number of residential and commercial roofing products, including shingles, roll roofing, undergarments and various membranes.

Asphalts used as paving cements must also meet several diverse requirements. Asphalt pavement is predominantly a coated aggregate. The aggregate is of a size, cut and porosity which imparts to it a relatively large surface area per unit volume. In order to ensure adequate coating, a better wetting asphalt is needed, one which is readily fluid at process temperatures. Many paving cements meeting these requirements are less viscous and coat an aggregate surface with only a thin film of asphalt prone to oxidative aging. A goal of any engineering-based approach to pavement design necessarily includes a temperature-stable asphalt which has good rheological properties and aggregate adhesion and maximizes coating of the aggregate. Again, the performance properties of any one asphalt composition will determine whether it is appropriate for pavement construction.

Where bituminous material, whether it be intended for a roofing, pavement, or other such application, does not initially have the desired performance properties, further processing can modify and/or tailor the bitumen for a given use/application. Using asphalt as an example, refining processes can be altered to provide the desired asphalt. Alternatively, as would be more typical in the paving context, less viscous, lighter fractions may be blended with high viscosity asphalts to achieve the desired performance level. Another approach is to incorporate the bitumen into a cold-applied system, which can take the form of one of various cutback solvent and aqueous emulsion compositions.

A common modification technique is oxidation of the bitumen through the introduction of hot air through a heated fluid bitumen. While the mechanism is not fully understood, the heat and oxygen are thought to initiate various chemical reactions, changing the physical properties of the bitumen. This "air blowing" process can be monitored and halted when the desired properties/characteristics are obtained. Other methods, including addition of various catalytic agents, can also be used to effect oxidation, modify the bitumen material and alter its performance properties. However, air blowing and related modification methods are not always capable of sufficiently optimizing the performance properties of every bitumen to meet the requirements of a particular application, and are associated with a number of problems-including by-product emissions and condensates from the air blowing process which create pollution and/or disposal concerns.

Again, considering asphalt as a representative bitumen, air blown asphalts have been used for residential and commercial products and systems for many years, but are often characterized by reoccurring material failures due primarily to extremes in ambient temperatures. As would be expected, it is undesirable that an asphalt flows under pressure loads or the heat of a summer sun, but an asphalt hard enough to resist flow will often be brittle and prone to cracking at low temperatures. Conversely, an asphalt exhibiting good low temperature properties may exhibit unacceptable flow or deformation during the summer months.

The addition of modifiers has been used to overcome such problems. For over 100 years, natural rubber has been incorporated into bitumens (often emulsified, cutback or otherwise treated) to provide elasticity and improve the handling and service qualities. More recently, synthetic or reclaimed rubber, alone or with other modifiers, such as, fibers, fillers, natural asphaltites, oils, and other polymers, have been incorporated into asphalt to modify various physical properties relating to viscosity or flow, extendibility, and brittleness. Numerous polymeric systems have been used to modify bitumens. Considering for purposes of example a styrene-butadiene-styrene (SBS) system and modification of an asphaltic bitumen, while many advantages are available, several performance standards may not be met depending upon the application. For example, higher SBS concentrations can yield an asphalt material too stiff and/or viscous for a given use or a particular processing/application technique. Heating improves viscosity, but excessive heat can thermally degrade the polymer and/or asphalt. The wetting of or adhesion to filler materials or surface granules can also be inadequate.

The use of polymer-modified asphalts has increased in use and importance in roadway construction. Applications are relatively varied and include reinforcing membranes, as well as binders for surface dressings, porous asphalt, mastic asphalt, and asphalt concrete. Generally, the polymers used are similar to those described elsewhere herein. Considering an SBS modifier for purposes of illustration, while such a system affords many advantages, numerous performance standards may not be met, depending upon the pavement application. For example, SBS-modified asphalts have relatively poor aggregate wetting/coating properties, with a decrease in wetting with increasing polymer concentration. Poor wetting can be a consequence of attempting to achieve other enhanced performance properties. As a result, various fluxing agents, diluents and/or other such compatibilizers are frequently required to adequately incorporate a particular polymer into an asphalt base. Many of the same and/or comparable problems occur with use of either hot-applied (fluxing agent and/or diluent) and emulsified polymer-modified asphalts.

There are a considerable number of performance-related problems and deficiencies associated with bituminous compositions, as used in the construction/building industry-irrespective of the particular bitumen or modification technique employed. There is a demonstrated need for bituminous materials having modified and/or enhanced performance properties, which can also be prepared by an economic, clean alternative to air blowing.

Accordingly, it is an object of the present invention to provide bituminous compositions having modified performance properties and thereby overcoming various deficiencies and short comings of the prior art, including those outlined above. It will be understood by those skilled in the art that one or more aspects of this invention can meet certain objectives, while one or more other aspects can meet certain other objectives. Each objective may not apply equally, in all instances, to every aspect of the present invention.

SUMMARY OF THE INVENTION

The present invention includes bituminous compositions having: (a) about 0.1 to about 60 percent by weight of an oxidation product of a naturally occurring asphalt from the Orinoco Belt of Venezuela; and (b) about 3.0 to about 99.5 percent by weight of a bitumen base material. As known to those skilled in the art the terms bitumen and bituminous can refer generically to various asphalts, coal tars, pitches and the like. However as it is also understood that outside North America and, particularly, the United States, the term "bitumen" is applied generically to mean other asphalt materials. The compositions of this invention include those comprising the high molecular weight hydrocarbons which predominate and are found in asphalts, coal tars, pitches, asphaltites and the like, notwithstanding any difference in generic nomenclature. Accordingly, the bitumen component of the inventive compositions described herein can be drawn, without limitation, from various known sources of asphalt, coal, tar, and coal tar pitches, whether neat, dissolved, emulsified, or polymer modified.

More specifically, an asphalt material utilized in accordance with this invention can be derived from any one of a number of refined crude oils, naturally occurring asphalts, and combinations thereof. Included within the broad category of refined crude oils are various recycled asphaltic waste materials, including but not limited to those waste materials and components thereof described in columns 4–8 of U.S. Pat. No. 5,217,530, which is incorporated herein by reference in its entirety. More particularly, the asphalt material can be but is not restricted to (1) a cementitious asphalt having physical properties meeting or equivalent to ASTM D 3381 standard specifications for use in pavement construction—see Tables A–C below; (2) a cementitious asphalt having physical properties meeting or equivalent to ASTM D 946 standard specifications for use of such an asphalt in pavement construction—see Table D, below or (3) a roofing asphalt having physical properties meeting or equivalent to ASTM D 312 standard specifications for use of such an asphalt in built-up roof construction—see Table E, below, or (4) an asphalt having physical properties meeting or equivalent to ASTM D 449 standard specifications for use in damp-and waterproofing—see Table F, below. While various physical properties are described in the context of recognized ASTM standards, comparable and/or equivalent standards and specifications can also be used to describe this bitumen component, including but not limited to such standards recognized in Germany, the United Kingdom, Italy and Canada. It is preferred but not necessary that these materials be substantially homogenous and free of water, and non-foaming when heated to 347° F. (175° C.). Likewise, the bituminous compositions available/producible through implementation of the present invention can optionally have physical properties meeting or equivalent to those specified in the respective ASTM or equivalent standards.

More specifically, a coal tar and/or coal tar pitch material utilized in accordance with a bituminous composition of this invention can be derived from the destructive distillation and/or subsequent processing of coal. The coal tar/pitch material can be but is not restricted to (1) a coal tar pitch having physical properties meeting or equivalent to ASTM D 450 standard specifications for use in built-of roofing, dampproofing, a waterproofing—see Table G below; (2) a coal tar having compositional properties meeting or equivalent to ASTM D 4022 standard specifications for use of such a coal tar in roof cement—see Table 1, below; or (3) a bituminous tar having physical properties meeting or equivalent to ASTM D 490 standard specifications for use of such tars on roads/pavements—see Table H, below. Again, while various physical properties are described in the context of recognized ASTM standards, comparable and/or equivalent standards and specifications can also be used to describe this bitumen component, including but not limited to such standards recognized in Germany, the United Kingdom, Italy and Canada. The bituminous compositions available/producible through implementation of the present invention can optionally have physical properties meeting or equivalent to those specified in the respective ASTM or equivalent standards.

It should be understood and as is apparent from the examples, tables and surveys which follow that the asphalt element/component of method(s) and/or compositions of this invention is not limited to any one type or grade specified in the latest revision of the aforementioned ASTM standards and/or any previous version thereof. Preferred embodiments include specified types and/or grades where improved performance properties are desired, and the modifications/enhancements contemplated herein include those associated with movement from one type or grade to another and depending upon use or application. With equal utility, the bituminous compositions can comprise non-air blown or partially air blown asphalts having physical properties either within or outside the ASTM standards. As referenced in each of the aforementioned ASTM standards, incorporated herein in their entirety, and as well-known to those skilled in the art, the bitumen specified under each standard is prepared from commercially-available raw materials by known methods. The same can be used with the present invention, with the resulting compositions suitable for air blowing or having the physical properties of a specific ASTM type or grade.

TABLE A

ASTM D 3381 Requirements for Asphalt Cement, Viscosity Graded at 140° F. (60° C.)

Grading based on original asphalt.

| Test | Viscosity Grade | | | | |
|---|---|---|---|---|---|
| | AC-2.5 | AC-5 | AC-10 | AC-20 | AC-40 |
| Viscosity, 140° F. (60° C.), P | 250 ± 50 | 500 ± 100 | 1000 ± 200 | 2000 ± 400 | 4000 ± 800 |
| Viscosity, 275° F. (135° C.), min, cSt | 80 | 110 | 150 | 210 | 300 |
| Penetration, 77° F. (25° C.), 100 g, 5 s, min | 200 | 120 | 70 | 40 | 20 |
| Flash point, Cleveland open cup, min, °F. (°C.) | 325 (163) | 350 (177) | 425 (219) | 450 (232) | 450 (232) |
| Solubility in trichloroethylene, min, % | 99.0 | 99.0 | 99.0 | 99.0 | 99.0 |
| Tests on residue from thin-film oven test: | | | | | |
| Viscosity, 140° F. (60° C.), max, P | 1250 | 2500 | 5000 | 10,000 | 20,000 |
| Ductility, 77° F. (25° C.), 5 cm/min, min, cm | 100* | 100 | 50 | 20 | 10 |

*If ductility is less than 100, material will be accepted if ductility at 60° F. (15.5° C.) is 100 minimum at a pull rate of 5 cm/min.

TABLE B

ASTM D 3381 Requirements for Asphalt Cement Viscosity Graded at 140° F. (60° C.)

Grading based on original asphalt.

| Test | Viscosity Grade | | | | | |
|---|---|---|---|---|---|---|
| | AC-2.5 | AC-5 | AC-10 | AC-20 | AC-30 | AC-40 |
| Viscosity, 140° F. (60° C.), P | 250 ± 50 | 500 ± 100 | 1000 ± 200 | 2000 ± 400 | 3000 ± 600 | 4000 ± 800 |
| Viscosity, 275° F. (135° C.), min cSt | 125 | 175 | 250 | 300 | 350 | 400 |
| Penetration, 77° F. (25° C.), 100 g, 5 s, min | 220 | 140 | 80 | 60 | 50 | 40 |
| Flash pt., Cleveland open cup, min, °F. (°C.) | 325 (163) | 350 (177) | 425 (219) | 450 (232) | 450 (232) | 450 (232) |
| Solubility in trichloroethylene, min, % | 99.0 | 99.0 | 99.0 | 99.0 | 99.0 | 99.0 |
| Tests on residue from thin-film oven test: | | | | | | |
| Viscosity, 140° F. (60° C.), max, P | 1250 | 2500 | 5000 | 10,000 | 15,000 | 20,000 |
| Ductility, 77° F. (25° C.), 5 cm/min, min, cm | 100* | 100 | 75 | 50 | 40 | 25 |

*If ductility is less than 100, material will be accepted if ductility at 60° F. (15.5° C.) is 100 minimum at a pull rate of 5 cm/min.

TABLE C

ASTM D 3381 Requirements for Asphalt Cement Viscosity Graded at 140° F. (60° C.)

Grading based on residue from rolling thin-film oven test.

| Tests on Residue from Rolling Thin-Film Oven Test:* | Viscosity Grade | | | | |
|---|---|---|---|---|---|
| | AR-1000 | AR-2000 | AR-4000 | AR-8000 | AR-16000 |
| Viscosity, 140° F. (60° C.), P | 1000 ± 250 | 2000 ± 500 | 4000 ± 1000 | 8000 ± 2000 | 16000 ± 4000 |
| Viscosity, 275° F. (135° C.), min, cSt | 140 | 200 | 275 | 400 | 550 |
| Penetration, 77° F. (25° C.), 100 g, 5 s, min | 65 | 40 | 25 | 20 | 20 |
| % of original penetration, 77° F. (25° C.), min | — | 40 | 45 | 50 | 52 |
| Ductility, 77° F. (25° C.), 5 cm/min, min, cm | 100** | 100** | 75 | 75 | 75 |
| Tests on original asphalt: | | | | | |
| Flash point, COC, min, °F. (°C.) | 400(205) | 425(219) | 440(227) | 450(232) | 460(238) |
| Solubility in trichloroethylene, min, % | 99.0 | 99.0 | 99.0 | 99.0 | 99.0 |

*Thin film oven test may be used but the rolling thin-film oven test shall be the referee method.
**If ductility is less than 100, material will be accepted if ductility at 60° F. (15.5° C.) is 100 minimum at a pull rate of 5 cm/min.

TABLE D

ASTM D946 REQUIREMENTS FOR ASPHALT CEMENT FOR USE IN PAVEMENT CONSTRUCTION

| | Penetration Grade | | | | | | | | | |
|---|---|---|---|---|---|---|---|---|---|---|
| | 40–50 | | 60–70 | | 85–100 | | 120–150 | | 200–300 | |
| | Min. | Max. | Min. | Max. | Min. | Max. | Min. | Max. | Min. | Max. |
| Penetration at 77° F. (25° C.) 100 g. 5 s | 40 | 50 | 60 | 70 | 85 | 100 | 120 | 150 | 200 | 300 |
| Flash point, °F. (Cleveland open cup) | 450 | — | 450 | — | 450 | — | 425 | — | 350 | — |
| Ductility at 77° F. (25° C.) 5 cm/min, cm | 100 | — | 100 | — | 100 | — | 100 | — | 100* | — |
| Solubility in trichloroethylene, % | 99.0 | — | 99.0 | — | 99.0 | — | 99.0 | — | 99.0 | — |
| Retained penetration after then-film oven test, % | 55+ | — | 52+ | — | 47+ | — | 42+ | — | 37+ | — |
| Ductility at 77° F. (25° C.) 5 cm/min, cm after thin-film oven test | — | — | 50 | — | 75 | — | 100 | — | 100* | — |

*If ductility at 77° F. (25° C.) is less than 100 cm, material will be accepted if ductility at 60° F. (15.5° C.) is 100 cm minimum at the pull rate of 5 cm/min.

TABLE E

ASTM D312 PHYSICAL REQUIREMENTS FOR ASPHALT IN ROOFING

| | Type I | | Type II | | Type III | | Type IV | |
|---|---|---|---|---|---|---|---|---|
| Property | Min. | Max. | Min. | Max. | Min. | Max. | Min. | Max. |
| Softening point, °F. (°C.) | 135(57) | 151(66) | 158(70) | 176(80) | 185(85) | 205(96) | 210(99) | 225(107) |
| Flash point, °F. (°C.) | 475(246) | — | 475(246) | — | 475(246) | — | 475(246) | — |
| Penetration, units: | | | | | | | | |
| at 32° F. (0° C.) | 3 | — | 6 | — | 6 | — | 6 | — |
| at 77° F. (25° C.) | 18 | 60 | 18 | 40 | 15 | 35 | 12 | 25 |
| at 115° F. (46° C.) | 90 | 180 | — | 100 | — | 90 | — | 75 |
| Ductility at 77° F. (25° C.), cm | 10.0 | — | 3.0 | — | 2.5 | — | 1.5 | — |
| Solubility in trichloroethylene, % | 99 | — | 99 | — | 99 | — | 99 | — |

TABLE F

ASTM D 449 Physical Requirements of Asphalt Used in Dampproofing and Waterproofing

| | Type I | | Type II | | Type III | |
|---|---|---|---|---|---|---|
| | Min | Max | Min | Max | Min | Max |
| Softening point (ring-and-ball), °F. (°C.) | 115(46) | 140(60) | 145(63) | 170(77) | 180(82) | 200(93) |
| Flash point (Cleveland open cup), °F. (°C.) | 450(232) | — | 450(232) | — | 475(246) | — |
| Penetration: | | | | | | |
| 32° F.(0° F.), 200 g, 60 s; 0.1 mm | 5 | — | 10 | — | 10 | — |
| 77° F.(25° C.), 100 g, 5 s; 0.1 mm | 50 | 100 | 25 | 50 | 20 | 40 |
| 115° F.(46° C.), 50 g, 5 s; 0.1 mm | 100 | — | — | 130 | — | 100 |
| Ductility at 77° F.(25° C.), cm | 30 | — | 10 | — | 2 | — |
| Solubility in trichloroethylene, % | 99 | — | 99 | — | 99 | — |

TABLE G

ASTM D 450 Requirements of Coal-Tar Pitch for Built-Up Roofing, Dampproofing, and Waterproofing

|  | Type I | Type II | Type III |
|---|---|---|---|
| Water, max, % | 0 | 0 | 0 |
| Specific gravity, 25/25° C. | 1.22 to 1.34 | 1.22 to 1.34 | 1.22 to 1.34 |
| Softening point (ring-and-ball), °F. (°C.) | 126 to 140(52 to 60) | 106 to 126(41 to 52) | 133 to 147(56 to 64) |
| Flash Point, Cleveland open cup, min, °F. (°C.) | 374(190) | 347(175) | 401(205) |
| Total pitch soluble in carbon disulfide, % | 72 to 85 | 72 to 85 | 72 to 85 |
| Ash, max, % | 0.5 | 0.5 | 0.5 |
| Total distillate: |  |  |  |
| 32 to 572° F. (0 to 300° C.), max, % | 10 | 10 | 0 |
| 32 to 599° F. (0 to 315° C.), max, % | — | — | 0 |
| 32 to 680° F. (0 to 360° C.), max, % | — | — | 5 |
| Specific gravity of distillate from 0 to 32 to 752° F. (300° C.), min, 38/15.5° C. | 1.03 | 1.03 | — |
| Softening point (ring-and-ball) of residue from distillation to 572° F. (300° C.), max, °C.(°F.) | 176(80) | 176(80) | — |

TABLE H

ASTM D 490 Requirements for Tars for Road/Pavement Use

|  | Grade RT-1 | Grade RT-2 | Grade RT-3 | Grade RT-4 | Grade RT-5 | Grade RT-6 | Grade RT-7 |
|---|---|---|---|---|---|---|---|
| Water by volume %, max | 2.00 | 2.00 | 2.00 | 2.00 | 1.5 | 1.5 | 1.0 |
| Specific gravity at 25/25° C. (77/77° F.), min | 1.08 | 1.08 | 1.09 | 1.09 | 1.10 | 1.10 | 1.12 |
| Specific viscosity*: |  |  |  |  |  |  |  |
| Engler, 50 mL |  |  |  |  |  |  |  |
| at 40° C. (104° F.) | 5 to 8 | 8 to 13 | 13 to 22 | 22 to 35 | — | — | — |
| at 50° C. (122° F.) | — | — | — | — | 17 to 26 | 26 to 40 | — |
| Float test, |  |  |  |  |  |  |  |
| at 32° C. (89.6° F.) | — | — | — | — | — | — | 50 to 80 |
| at 50° C. (122° F.) | — | — | — | — | — | — | — |
| Distillation test on water-free material |  |  |  |  |  |  |  |
| Total distillate, max %: |  |  |  |  |  |  |  |
| to 170° C. (338° F.) | 7.0 max | 7.0 max | 7.0 max | 5.0 max | 5.0 max | 5.0 max | 3.0 max |
| to 200° C. (392° F.) | — | — | — | — | — | — | — |
| to 235° C. (455° F.) | — | — | — | — | — | — | — |
| to 270° C. (528° F.) | 35.0 max | 35.0 max | 30.0 max | 30.0 max | 25.0 max | 25.0 max | 20.0 max |
| to 300° C. (572° F.) | 45.0 max | 45.0 max | 40.0 max | 40.0 max | 35.0 max | 35.0 max | 30.0 max |
| Softening point (ring-and-ball method) of residue from distillation test | 30 to 60° C. (86 to 140° F.) | 30 to 60° C. (86 to 140° F.) | 35 to 65° C. (95 to 149° F.) | 35 to 65° C. (95 to 149° F.) | 35 to 70° C. (95 to 158° F.) | 35 to 70° C. (95 to 158° F.) | 35 to 70° C. (95 to 158° F.) |
| Total Bitumen (soluble in carbon disulfide) weight %, min | 88 | 88 | 88 | 88 | 83 | 83 | 78 |

|  | Grade Rt-8 | Grade Rt-9 | Grade Rt-10 | Grade Rt-11 | Grade Rt-12 | Grade Rt-13 | Grade Rt-14 |
|---|---|---|---|---|---|---|---|
| Water by volume %, max | none | none | none | none | none | 1.0 | 1.0 |
| Specific gravity at 25/25° C. (77/77° F.), min | 1.14 | 1.14 | 1.15 | 1.16 | 1.16 | 1.09 | 1.09 |
| Specific viscosity: |  |  |  |  |  |  |  |
| Engler, 50 mL |  |  |  |  |  |  |  |
| at 40° C. (104° F.) | — | — | — | — | — | — | — |
| at 50° C. (122° F.) | — | — | — | — | — | 17 to 26 | 26 to 40 |
| Float test, |  |  |  |  |  |  |  |
| at 32° C. (89.6° F.) | 80 to 120 | 120 to 200 | — | — | — | — | — |
| at 50° C. (122° F.) | — | — | 75 to 100 | 100 to 150 | 150 to 220 | — | — |
| Distillation test on water-free material |  |  |  |  |  |  |  |
| Total distillate, max %: |  |  |  |  |  |  |  |
| to 170° C. (338° F.) | 1.0 max | 1.0 max | 1.0 max | 1.0 max | 1.0 max | 2.0 to 8.0 | 2.0 to 8.0 |
| to 200° C. (392° F.) | — | — | — | — | — | 5.0 min | 5.0 min |

TABLE H-continued

ASTM D 490 Requirements for Tars for Road/Pavement Use

|  | | | | | | | |
|---|---|---|---|---|---|---|---|
| to 235° C. (455° F.) | — | — | — | — | — | 8.0 to 18.0 | 8.0 to 18.0 |
| to 270° C. (528° F.) | 15.0 max | 15.0 max | 10.0 max | 10.0 max | 10.0 max | — | — |
| to 300° C. (572° F.) | 25.0 max | 25.0 max | 20.0 max | 20.0 max | 20.0 max | 35.0 max | 35.0 max |
| Softening point (ring-and-ball method) of residue from distillation test | 35 to 70° C. (95 to 158° F.) | 35 to 70° C. (95 to 158° F.) | 40 to 70° C. (104 to 158° F.) | 40 to 70° C. (104 to 158° F.) | 40 to 70° C. (104 to 158° F.) | 40 to 70° C. (104 to 158° F.) | 40 to 70° C. (104 to 158° F.) |
| Total Bitumen (soluble in carbon disulfide) weight %, min | 78 | 78 | 75 | 75 | 75 | 80 | 80 |

*The consistency limits are subdivided into grades Rt-1 to Rt-12, inclusive, and grades Rt.C.B.-5, Rt.C.B.-6, so that material may be chosen to meet the local conditions of temperature, road conditions, and climate.

TABLE I

ASTM D 4022 Compositional Requirements for Coal Tar for Use in Roof Cement

|  | min | max |
|---|---|---|
| Water, volume % | — | 1.0 |
| Nonvolatile matter, mass % | 65 | — |
| Insoluble matter, mass % | 15 | 40 |

Alternatively, the bitumen base materials which can be used with this invention include cutback solutions or aqueous emulsions of a suitable base material, of the types which could be used in the formulation of bituminous compositions for cold application. Nonetheless, the compositions and/or methods of the present invention can suitably comprise, consist of, or consist essentially of elements and/or components involving asphalts, coal, tars, coal tar pitches, and asphaltites. Each such composition is compositionally distinguishable, characteristically contrasted, and can be practiced in conjunction with the present invention separate and apart from another. Accordingly, it should be understood that the inventive compositions and methods for their preparation, as illustratively disclosed herein, can be prepared and/or practiced in the absence of any one component, species and/or step which may or may not be specifically disclosed, referenced or inferred herein, the absence of which may or may not be specifically disclosed, referenced or inferred herein.

As described above, the inventive bituminous compositions have incorporated therein an oxidation product of a naturally occurring asphalt from the Orinoco Belt of Venezuela. Generally and as will be well known to those skilled in the art made aware of the invention, such an oxidation product can be prepared by contacting the asphalt material with air and/or another oxygen-containing stream, through any one of several recognized processes or variations thereof, to provide the oxidation product in addition to combustion by-products such as heat, carbon dioxide and water. The oxidation product is the solid residual material subsequently collected downstream from the point of combustion/oxidation.

The oxidation product of the present invention can be generated in such a manner as to include the introduction of one of several auxiliary processes and/or additives upstream, downstream or at the point of combustion, to meet various process or combustion requirements, relating but not limited to emission control, reduced corrosion or enhanced operability. Depending upon the nature of these additives, the combustion residue or by-products thereof can become intimately co-mingled with either the oxidation product described above and can be, where appropriate, considered part of, integral to, and used with the present invention.

Illustretive of an auxiliary process and/or additive is the incorporation of a flue gas clean up device—such as a wet lime-limestone scrubber—downstream from the combuster. Residual scrubber residues can be returned and/or reintroduced to the combustion/oxidation line at a point upstream of the final particulate separator, such that the residues are mixed with and incorporated into the oxidation product. Again, considering a scrubber process as illustrative of a number of available auxiliary processes, one skilled in the art will recognize that the identity/composition of the scrubber residues are a factor of the identity of the particular scrubbing reagent, whether it be lime, limestone or a related scrubbing reagent, and the compositional components and their relative concentrations of the make-up of water used in the scrubber.

A preferred source of oxidation product is an aqueous emulsion of a naturally occurring Orinoco-type asphalt. Such a material is commercially available from Bitor America Corporation, Boca Raton, Fla., under the Orimulsion® trademark. Without limitation, this commercial product is currently prepared by initial injection of steam into the asphalt formation until the viscosity is reduced to a point permitting it to flow into a well bore. A primary aqueous emulsion is prepared which further reduces asphalt viscosity and facilitates handling and transportation. The primary emulsion is then broken with the water substantially removed, leaving an asphalt material with less than 2 percent water. Fresh water is reintroduced and the asphalt is emulsified with a surfactant under strictly controlled protocols. For example, for a shear rate of 20 s-1, a viscosity of about 450 mPas is achieved by testing the Orimulsion® material at 30° C. This and comparable production methods and techniques provide an aqueous emulsion with no more than 2 percent of the droplets having a diameter higher than 80 microns. The Orimulsion® material is further characterized by density (~1,010 Kg/m3 at 15° C.), flash point (~130° C./266° F.), and concentrations of vanadium (~300 ppm), nickel (~73 ppm), magnesium (~350 ppm), carbon (~60.0 weight percent), hydrogen (~7.5 weight percent), sulfur (~2.7 weight percent), nitrogen (~0.50 weight percent) and oxygen (~0.20 weight percent).

It will be understood by those skilled in the art that the compositions and methods of the present invention are not restricted by incorporation of an oxidation product of any one Orinoco-type asphalt material. Whereas a commercially-available Orinoco asphalt material might be described as a 30 percent aqueous emulsion prepared with a non-ionic surfactant, the compositions of the present invention can suitably comprise, consist of, or consist essentially of the oxidation product of such material and/or oxidation products of other Orinoco-type asphalts, emulsified or otherwise processed. Each such oxidation product is compositionally distinguishable, characteristically contrasted, and can be practiced in conjunction with the present invention separate and apart from another. Accordingly, it should be understood that the inventive compositions and methods for the preparation, as illustratively disclosed herein, can be prepared and/or practiced in the absence of any one oxidation product, species and/or step which may or may not be specifically disclosed, referenced or inferred herein, the absence of which may or may not be specifically disclosed, referenced or inferred herein.

While other components, mixtures or formulations involving a naturally-occurring Orinoco-type asphalt can be used herewith, a useful source of the inventive oxidation product is available under the PCS trademark, available from Pure Air, a division of Air Products and Chemicals, Inc. of Allentown, Pennsylvania. As described above, the compositional profile of an oxidation product will reflect any operation and/or additive auxiliary to the asphalt and/or combustion process. However, any such oxidation product-while compositionally distinguishable, characteristically contrasted, and separately practiced—will reflect either the absolute or relative vanadium and nickel concentrations characteristic of a naturally-occurring asphalt from the Orinoco Belt of Venezuela.

The oxidation product, whether or not derived from an aqueous emulsion, can be used effectively over the weight percent range described above. At amounts under the lower end of the given range, the enhancement of various performance properties of the resulting bituminous compositions—including increased material viscosity—tends to fall below levels which may be sufficient and/or cost-productive. At concentrations of oxidation product beyond the referenced range, effective reaction and/or interaction with the bitumen component becomes problematic, primarily due to excessive viscosity. However, improvements in existing technology and processing will serve to increase the effective and beneficial concentration range over which the inventive oxidation products may be employed. As is applicable to other aspects of this invention, various time, temperature and mix parameters, as recognized by those of skill in the art, can be used and/or modified with a given concentration of oxidation product to achieve a desired, predetermined performance property.

The oxidation product and/or that derived from an aqueous emulsion of an Orinoco-type asphalt—both of which can be used separately as part of this invention—would not seem appropriate for use in a bituminous composition for the purpose of modifying performance properties. It would seem improbable that these materials could be used effectively at any concentration for any purpose but as an inert filler material. It would also seem improbable that such materials would provide bituminous compositions, in particular those for use in pavement or roofing, with the viscosity, penetration, stability, and/or durability properties desired.

The use of such oxidation products in the manner disclosed herein is contrary to the art. The enhanced engineering performance properties obtained were surprising and quite unexpected and represent a substantial improvement over the use of material such as fly ash from coal, comparative data for which is provided below. Without restriction to any one theory or mode of operation it appears the finely divided oxidation product solid particulates, as specified herein, interact and/or react with the bitumens in which they are incorporated to oxidize, polymerize, or otherwise modify the bitumen in a manner dependent upon concentration, the temperature and/or bitumen type.

In various embodiments, the bituminous compositions of the present invention and/or bitumen component thereof can also contain at least about 1.0 per cent and up to about 40 per cent by weight of a polymeric material, of the type but not limited to an elastomer, a plastomer or a combination of one or more elastomers and plastomers. As with the oxidation product discussed above, the useful polymer concentration range is a factor of the enhancement of various desired performance properties in conjunction with considerations such as cost-effectiveness. In a general sense, elastomere can be defined as those polymeric materials extendable under low stress without rupture and exhibiting resilient properties upon stress removal. Likewise, in a general sense, plastomers can be defined as polymeric materials of the type which, under stress conditions, rupture when deformed.

In preferred embodiments, a polymer component of the present invention can be a styrene-butadiene-styrene co-polymer, styrene-butadiene co-polymer, styrene-butadiene-rubber co-polymer, ethylene-vinylacetate co-polymer, isotactic and/or atactic polypropylene, polyethylene, or a combination thereof, Other suitable polymeric systems include, without limitation, styrene-ethylene-butylene-styrene, atactic polyolefins, polyvinylchloride, various polyvinylchloride blends such as ethylene interpolymers, as well as various chloroprene, acrylate, and nitrile rubber systems.

The percentages of each monomer, block or otherwise, can vary from system to system, depending upon commercial availability, desired properties, and end use or application. By way of example and without limitation, a styrene-butadiene-styrene co-polymer can contain from about 20 to about 40 weight percent styrene, preferably from about 25 to about 30 weight per cent; while an ethylene-vinylacetate system can contain form about 20 to about 50 weight percent vinylacetate, preferably from about 30 to about 40 weight per cent. Other physical properties, such as molecular weight and structure/morphology can be chosen, in accordance with this invention, to meet the performance properties or requirements of a particular bituminous composition.

While there are currently no ASTM standard specifications for polymer-modified asphaltic compositions, various properties are recognized as indicative of performance, including those properties assessed in the examples which follow herein. The protocols for most evaluations can be found in or derived from the ASTM D 5147 test method standard, which is incorporated herein by reference in its entirety. However, standard specifications have been developed for various coal tar and coal tar pitch compositions, such as those used for pavement coatings and overlays, and are found in or derived from the ASTM D 4866 standard performance specification, and elsewhere in the Annual Book of ASTM Standards, incorporated in pertinent part herein.

Various embodiments of the bituminous compositions described herein can also include a filler material in an amount of at least about 1 per cent by weight and up to about 80 percent by weight. Fillers can be used as bulking agents, in concentrations as needed, to thicken and/or stabilize bituminous compositions after application, as well as to impart various texture properties-especially so in the roofing context. As distinguished from the aggregate materials, discussed below, filler materials are typically size-graded below 40–60 mesh and can be composed partially or in their entirety of the various silicates, the halides, hydroxides, carbonates and sulfates of Group IIA metals, as well as the halides, hydroxides, carbonates and sulfates of Group IA metals. In particular, without limitation, useful filler materials can include sand, mica, ground slate, diatomaceous earth, and ground limestone, or their compositional components. Bituminous compositions incorporating such a filler material can also include an elastomer, plastomer or a combination thereof, in concentrations and in the manner as described above.

The bituminous compositions of this invention, including those which have a polymeric component as described above, can be admixed with an aggregate material as defined in AASHTO specifications M6, M43, M80 and M195 (which specifications are incorporated herein in their entirety), i.e. from about −200 mesh to about 4 inches, and present in the amount from about 85 to about 97 percent by weight, based upon the total compositional weight. Without limitation or restricting the scope of this invention, the bitumen and aggregate compositions so derived can be used as hot mixes for pavement applications or, alternatively, cold patches for pavement repair. In the hot mix context, the aggregate material is preferably present in an amount from about 92 to about 96 percent by weight, based upon the total weight of the bituminous composition. In the cold patch context, the aggregate material is preferably present in amount from about 88 to about 94 percent by weight, based upon the total weight of the bituminous composition.

Aggregate performs something of a dual role, whether within the context of a bituminous hot mix pavement or a cold patch. It has a performance function, in that it stabilizes the pavement or cold patch by absorbing stress and strain. The choice of aggregate type and gradation significantly affects performance. In preferred embodiments of this invention, crushed stone aggregates having multiple-fractured surfaces promote the requisite stability and adhesion. Size-gradation is a matter of choice, depending upon end-use of the bituminous composition as well as the thickness and density required, but a suitable aggregate is typically continuously graded from a filler material to the maximum aggregate size required by the pavement design.

It is not intended that the aggregate component of any bituminous composition be necessarily limited to conventional materials. While hot mix pavements and cold patches are often described in terms of graded stones and gravels, other less-typical aggregates are also contemplated by this invention, including, without limitation, recycled plastics, crushed glass, recycled concrete, and recycled bituminous pavements. Suitable aggregate can also be obtained directly from various sources of recycled bituminous roofing waste, primarily commercial roofs.

When employed as a paving composition, it is also contemplated that compositions of this invention can also contain or be admixed with any one or more of the well known and commonly used materials generally referred to as "paving additives." Materials typically employed by the industry as paving additives include, for example, antistrips, fibers, ground tire rubber, antioxidants, oxidants, asphaltites, extender oils, carbon black, recycled asphaltic pavement and other recycled asphaltic materials, such as roofing waste. These paving additives can be present in the composition of this invention in proportions ranging from about 0.1 per cent by weight up to about 50 per cent by weight. Usually, when employed, paving additives are present in at least about 0.5 per cent by weight. Normally, the amount of paving additive employed does not exceed about 30 per cent by weight. It will be understood by those skilled in the art that specific paving additives are preferably employed in different specific ranges. Thus, for example, anti strips are typically employed in lower concentrations (e.g., from about 0.1 up to about 3 per cent by weight), while paving additives such as ground tire rubber are employed in higher concentrations (e.g., from about 5 to about 30 per cent by weight).

As referenced above, a unique interaction and/or reactivity between the oxidation products of this invention and a bituminous base material is believed to be responsible for the improved performance observed. With respect to paving cements, pavements and/or cold patches, improved bitumen viscosity—as obtainable through the compositions described herein—provides a thicker film around each aggregate particle, the beneficial results of which tend to be three-fold. First, the bitumen is less susceptible to oxidative processes, in that neither water nor air permeate and age the film prematurely. Second, a thicker film effectively lowers the voids content between aggregate particles, thereby decreasing the degree of water and air circulation through the aggregate matrix and further lessening the susceptibility of the bitumen component to premature aging. Third, a thicker, more viscous and temperature-stable bitumen prevents flushing—separation of the bitumen from the aggregate matrix—at high temperatures. In contrast, while pavements, cold patches and related compositions can include filler materials in concentrations on the order of about or less than 5 percent by weight, filler materials tend to provide little or no mechanical or load-bearing function.

As mentioned above, bituminous compositions, including polymeric additives, can be utilized in a variety of pavement contexts, including but not limited to waterproofing sheets and binders for surface dressings, mastic asphalt, bituminous concrete and cold patches. When incorporated into such binders and/or pavements, the oxidation products of this invention provide a stiffer, more viscous bituminous system by modifying either one or both of the bitumen and polymer components. The relative concentration of oxidation product is as described above and determined by the performance/ physical properties desired and anticipated end use or application. With respect to the polymer component, the oxidation products are available as co-modifiers to provide binders and/or pavements with comparable or enhanced performance properties at lower, more cost-effective polymer concentrations.

Improvements and/or modifications available through use of the present invention include, without limitation, increased binder viscosity, reduced thermal susceptibility, a broadened range of elasticity or plasticity, increased resistance to permanent deformation, increased resistance to fatigue at low temperatures, and slowed aging. While such attributes can be ascribed to various polymer-modified systems of the prior art, incorporation of the reactive solids and/or combustion products of the present invention facilitate the observation of significant and unexpected results/ improvements/modifications beyond those otherwise observed.

For those bituminous compositions-whether used as part of a hot mix pavement or cold patch material—including an aggregate component, where the polymer is an elastomer, the elastomer can have a concentration in a range from about 1 to about 5 percent by weight of the bitumen base material. Styrene-butadiene, styrene-butadiene-styrene, and styrene-butadiene-rubber co-polymers are representative of the elastomeric systems which can be used beneficially in conjunction with the bituminous compositions in a binder and/or pavement context. Likewise, where the polymer is a plastomer, the plastomer can be present in a range from about 3 to about 40 percent by weight of the bitumen base material. Such compositions can be employed in the pavement context where stiffer binders having high-load/high-stress capabilities are required, such as those located on bridge decks, airport runways and bus stops. By way of example only, a chip seal bituminous composition incorporating atactic polypropylene can be used beneficially. Preferably, depending upon the physical and performance properties required, the plastomer can be present in a range from about 5 to about 15 percent by weight of the bitumen base material.

As discussed above, the present invention also includes bituminous compositions wherein an included polymer component can be a combination of a plastomer and an elastomer. A preferred combination is one in which the elastomer component is present in the range from about 0.1 to about 3 percent by weight and the plastomer is present in the range from about 1 to about 10 percent by weight percent both of the bitumen base material. Other concentrations of elastomer and/or plastomer can be used, again depending upon the end use or application envisioned. However, generally and without limitation, the ratio of elastomer/plastomer concentration useful for most applications—and especially so in the binder/pavement context—is one derived from the relative weight percents described above. It should be understood that the concentration of oxidation product present in a bituminous composition, including a polymeric component, can range from about 0.1 to about 60 percent by weight, the particular concentration dependent upon the performance properties desired as determined by the individual properties imparted by both the polymer and oxidation product components.

The polymer-modified and/or bitumen-modified compositions of this invention can be prepared by any one of various suitable methods known to those skilled in the art. Typically, for hot bitumen compositions, the oxidation product is combined at temperatures of from about 325° F. (160° C.) up to about 400° F. (205° C.) and preferably from about 350° F. (210° C.) up to about 375° F. (190° C.), with low shear mixing usually sufficient. Mix temperatures must be adequate to fluidize the bitumen component and ensure substantially homogeneous dispersion of, and complete reaction of and/or interaction of the oxidation product. Mix temperatures and times should be chosen to minimize thermal degradation of the system.

It has been observed that incremental incorporation of the oxidation product of the present invention and/or a oxidation product of an aqueous emulsion of an Orinocotype asphalts, within bitumens such as those described above can incrementally improve the performance properties of the bitumen. As shown in one or more of the following examples, the improvement tends to be somewhat proportional to the amount of oxidation product incorporated within the bitumen. Generally, an incremental improvement/modification of a particular performance property is advantageous where a particular bituminous composition is used as part of a binder and/or pavement. Incorporation of about 2.5 to about 15 percent by weight of an oxidation product of an aqueous emulsion of a naturally occurring asphalt from the Orinoco belt of Venezuela has the effect of increasing the viscosity of the bitumen-base material, with heating at a time and temperature sufficient to provide such an improvement/modification.

While any non-air blown bitumen or partially air blown bitumen material can be employed, beneficial results are especially evident where the bitumen is an asphalt having an initial viscosity grade of about AC-5, or a comparable PG grade according to the Strategic Highway Research Program (SHRP) specification. Incorporation of such an oxidation product in an amount of about 5 weight percent increases the viscosity of the asphalt material about one grade. Where the oxidation product is incorporated in an amount of about 10 weight percent, the viscosity of the asphalt material is observed to increase by about 2 grades.

It will be understood by those skilled in the art and made aware of this invention that varying temperatures and mix times will affect the change in viscosity observed. Likewise, similar viscosity changes and/or modification of related performance properties are possible through use of non-asphalt bituminous base materials. As described more fully above, such compositions as prepared through incorporation of the inventive oxidation product can also include filler material and/or stabilizing aggregate.

Notwithstanding the aforementioned compositions and/or routes by way of enhancing/modifying certain performance properties, incorporation of about 0.1 to about 5 percent by weight oxidation product can be used beneficially in a number of applications. In particular, a resulting bituminous composition is useful as a binder in the pavement context. It has been observed that such concentrations of oxidation product improve the force ductility parameter or toughness of such a binder. It will be understood that various filler materials, of the sort described herein, can also be used.

Likewise, notwithstanding other compositions and/or methods described herein, the oxidation product of this invention can be utilized at a concentration of about 20 to about 60 percent by weight. In particular, oxidation product used at such concentrations in conjunction with an asphaltic bitumen can be used to prepare compositions which mimic various viscous naturally occurring asphalts of the type which are commercially blended with more liquid asphalts to prepare infrastructure materials such as bituminous concrete, sand asphalt, stone mastic asphalt, sheet asphalt and various porous pavements. At the concentrations referenced above, the oxidation product of the present invention can be used to prepare bituminous compositions which improve binder/pavement stability, high temperature performance and resistance to fatigue and cracking without decreasing low temperature performance. As such, these compositions can be used in place of Trinidad Lake asphalt and other such naturally occurring asphalts typically used in asphaltic blends. Again, it would be understood by those skilled in the art that the bitumen base material is not restricted to asphalt. Furthermore, the viscosity and related stiffening parameters can be modified in the presence of various filler materials and/or polymeric systems—both of which are as described more fully above.

The physical characteristics and performance properties of conventional filled, mineral-stabilized materials can be achieved through use of the present oxidation product. When used alone, the oxidation product can concomitantly fill the bitumen and effect chemical and/or physical changes otherwise obtainable only through air blowing and other such oxidizing/polymerizing processes. As shown in several of the following examples, the modified bitumens have improved storage stability, as observed through reduced settling. Such materials also exhibit lower specific gravities. From a practical standpoint, bituminous coatings/materials prepared using the oxidation product of the present invention will be more voluminous than those obtained through use of conventional fillers. With respect to a particular roofing product, lower specific gravities can provide a more aesthetically-pleasing roofing shingle due to the resulting thicker/higher profile.

Alternatively, the bituminous composition of the type useful as roofing materials can include, in addition to the oxidation product, the various filler materials described above and/or a partially air-blown bitumen. Such blended materials can include a filler present in the range from about 1 percent to about 20 percent by weight and oxidation product present in the range from about 25 percent to about 55 percent by weight. Without limitation as to the identity of a particular filler, a preferred embodiment is one in which the oxidation product and the filler have a combined concentration from about 15 percent to about 70 percent by weight of the total composition. Various preferred embodiments, available depending upon a particular end use and/or application, include those in which (1) the oxidation product and filler have a combined concentration from about 15 percent to about 30 percent by weight of the total composition, and (2) those where the oxidation product and the filler have a combined concentration from about 50 percent to about 70 percent by weight of the total composition. As with those compositions where oxidation product is used without a filler material, such blended materials, prepared with either a non-air blown bitumen or a partially air blown bitumen, have improved rheological properties and low temperature stability.

Polymeric systems can also be used to modify such compositions and/or roofing materials. For instance, incorporation of one or more elastomers can improve rheological characteristics at high temperatures without sacrificing low temperature properties. An elastomer in the range from about 5 percent to about 15 percent by weight can be used in conjunction with about 20 percent to about 40 percent by weight of an inventive oxidation product. Likewise, a plastomer, in the range from about 5 percent to about 40 percent by weight, can be used in conjunction with about 20 percent to about 40 percent by weight of an inventive oxidation product. Such elastomeric and plastomeric bituminous compositions can be used in conjunction with coatings and other roofing products and can be applied/installed using techniques completely analogous to those for conventional polymer/modified materials. For example, a bitumen material modified with the present oxidation product and atactic polypropylene can be torch-applied over a base sheet. Alternatively and for purposes of example only, a bitumen modified with the present oxidation product and a styrene-butadiene-styrene block co-polymer can be hot-mopped over a suitable base sheet. Likewise, without limiting the present invention, a self-adhering styrene-butadiene-styrene modified membrane prepared with the inventive oxidation product can be applied over a base sheet for a suitable water proofing layer. Without exception, the polymer- and/or bitumen-modified compositions of this invention can be utilized in any manner useful with conventional modified materials, allowing for changes in physical properties and/or characteristics induced by incorporation of the oxidation product of this invention.

The bituminous compositions described above can be prepared over a wide range of process conditions including, without limitation, temperature, mix time, component concentration, and order and/or rate of component incorporation. The choice and/or combination of process conditions can, to a large extent, determine the physical and/or performance properties of the resulting bituminous composition and, ultimately, the most beneficial use or application. Well-known blending or mixing procedures can be employed for preparation of the various roofing, pavement, or industrial compositions described herein. As will be understood by those of skill in the art, equipment such as binder reaction chambers, attrition mills, injection systems, highshear blending process units, and the like can be used. However achieved, thorough and complete incorporation of all ingredients/components as preferred to achieve homogeneity and to maximize the modification/enhancement of the desired the performance properties.

Generally, the compositions of this invention can be prepared by admixing the oxidation product with a bituminous base material at a temperature in the range from about 40° F. (4° C.) to about 850° F. (450° C.). Where a process is conducted beyond ambient temperatures, the bitumen is preferably heated to about 200° F. (90° C.) to about 850° F. (450° C.). and maintained at such a temperature through sufficient mixing of the oxidation product and any other component with the bitumen. It will be understood by those of skill in the art made aware of this invention that a useful process temperature is a factor of the particular process pressure employed, limited only by the available technology, and one which will not unduly impede incorporation of the oxidation product.

In accordance with this invention, the oxidation product can be incorporated into a bitumen at the various temperatures over which an asphalt or coal tar-based material might be refined, distilled, or otherwise manufactured. For example, about 0.2–60 weight percent oxidation product can be incorporated into a bitumen base material at a temperature in the range of from about 300° F. (140° C.) up to about 500° F. (260° C.). The resulting compositions will tend to exhibit improved hardness and viscosity over the bitumen base material and can be used effectively in the roofing context. By way of further example, about 2.5–12 weight percent oxidation product can be incorporated into a bitumen at a temperature of from about 300° F. (140° C.) up to about 450° F. (240° C.), with the resulting bituminous composition useful as a paving material. Various filler materials, such as those described more fully above, can also be admixed with a bituminous base material.

Where the bituminous compositions include a polymeric component, the process temperature should be less than about 450° F. (230° C.). Admixture with a bituminous base material at higher temperatures can have a deleterious effect on the polymer component. Depending upon the chemical and/or physical characteristics of a particular polymer, higher temperatures may effect thermal degradation, crosslinking, or other various structural changes which can negate the benefits otherwise available through polymer incorporation. Notwithstanding the process temperature referenced above, certain polymeric components can be used beneficially depending upon their thermal stability. Where a polymer-modified composition is desired, a preferred methodology is to admix, sequentially, asphalt, polymer, oxidation product, and filler material—at concentrations described more fully above.

Preferably, at the process and/or mix temperature chosen, the bituminous base material has sufficient fluid characteristics to permit facile and homogeneous incorporation of an oxidation product and whatever additional fillers, polymeric components and other modifiers desired. At temperatures approaching the upper end of the aforementioned range, the bituminous base material is invariably fluid. However, fluid characteristics can also be imparted to the base material by either mixing it with a suitable solvent to form a "cutback solution" or forming an emulsion with water.

The bituminous compositions prepared in this manner are designed to be employed without an external source of heat over a wide range of weather and application conditions, while still meeting specific performance standards. In addition to the components described above, various other materials can be incorporated into the bitumen solution or emulsion to achieve and/or improve one or more performance characteristics: fibers (synthetic and otherwise), pigments, and various miscellaneous chemical additives, including dispersants and surfactants, among others.

To prepare a bituminous cutback material, the oxidation product of this invention can be simply blended with a base material, at ambient or raised temperatures. Using techniques well-known to those skilled in the art, about 1–40 percent by weight oxidation product can be incorporated into bitumen cutback at temperatures up to about 160° F. (70° C.). The temperature utilized will be somewhat dependent upon the particular solvent system chosen, the amount of oxidation product and the specific bitumen; however, a preferred embodiment is one in which about 1–20 percent oxidation product is incorporated into an asphaltic base material at temperatures ranging from the ambient to about 140° F. (60° C.). Depending upon incorporation of filler, aggregate and the time over which the components are mixed and/or heated, the resulting compositions can find utility in either the roofing or paving contexts. As has been discussed with other embodiments, implementation of the present invention as part of a cutback system couples an economic advantage with improved performance. A lower cost, less-suitable bitumen base material can be modified to increase hardness, viscosity, and/or temperature-stability and provide an end product less susceptible to separation from any included filler and/or fiber component. Likewise, the resulting bituminous composition is more resistant to cracking at low temperatures and flow deformation at high temperatures. Higher viscosities can also enhance uniformity during processing, shipping and storage, without adversely affecting the shear-susceptibility of the applied end product.

The cutback base materials which can be used in conjunction with the methods of the present invention can be of the medium-cure, rapid-cure, or slow-cure varieties, with the solvent selected to control the cure rate of the resulting bituminous composition. Suitable cutback solutions can be purchased pre-blended from sources well-known to those skilled in the art. Alternatively, without limitation, cutback solutions can be prepared from various petroleum asphalts, coal tars or pitches upon solution with commercially-available solvents such as but not limited to Rule and Non-Rule 66 mineral spirits, kerosene/No. 2 fuel oil, and the like, as are provided by various well-known suppliers of distillates.

Where the bitumen base material is an aqueous emulsion, such materials can be prepared from either a neat bitumen or a cutback solution thereof. The oxidation product of the present invention can be blended into the bitumen at ambient or raised temperatures prior to emulsification. Using well-known methods and techniques, about 1–40 percent by weight oxidation product can be incorporated into bitumen emulsions at temperatures up to about 200° F. (93° C.). The temperature utilized will be somewhat dependent upon the particular emulsifier system chosen, the amount of oxidation product and the specific bitumen; however, the preferred embodiment is one in which about 1–20 percent oxidation product is incorporated into an asphaltic base material at temperatures ranging from the ambient to about 140° F. (60° C.). Depending upon incorporation of filler, aggregate and the time over which the components are mixed and/or heated, the resulting compositions can find utility in either the roofing or paving contexts. Emulsions produced in this manner can be used to prepare a variety of bituminous compositions, with the properties and characteristics described above.

While used more typically with cutback solutions than emulsions, both base materials can incorporate one of several clay components, such as the attapulgite, bentonite, and ball varieties, with or without a surfactant, to provide various texture, strength and thixotropic properties which might otherwise be provided through the use of an asbestos material.

It should be understood that emulsions of the sort discussed herein include those where clay and bitumen provide the discontinuous phase. Inverted emulsions, with water as the discontinuous phase, are also contemplated. Likewise, as mentioned above, various cutback emulsions, prepared from an bitumen/solvent slurry emulsified in water, can also be used—with either the water or slurry components as the discontinuous phase.

As mentioned above, the bituminous compositions can be prepared by various methods and/or orders of mixing. For instance, the inventive oxidation product can be first combined with any one or combination of the filler materials or compositional components thereof, such that the combined oxidation product and filler is available for admixing with a suitable bitumen. In such embodiments, the filler material can be present in a concentration as little as about 1 percent by weight or, alternatively, at a concentration at or about 55 percent by weight. In a similar fashion, a suitable concentration of the oxidation product, alone or with a filler, can be incorporated into a fiber material for later addition to a bitumen such as but not limited to asphalt. Likewise, the oxidation product can be dry blended with an aggregate for admixture with a bitumen base material. Where a heated bitumen is required, such an embodiment might also include pre-heating the oxidation product/aggregate blend to minimize congealing bitumen on the aggregate surface.

EXAMPLES OF THE INVENTION

The following non-limiting examples and data illustrate various aspects and features relating to the bituminous compositions, methods, and oxidation products of the present invention, including the reactivity and/or interactive utility of such oxidation products in conjunction with the preparation of various bituminous compositions having modified and/or enhanced performance properties.

Example 1

This example shows several bituminous compositions, having modified physical characteristics and performance properties, prepared by incorporation of an oxidation product of a naturally-occurring Orinoco-type asphalt ("OPOTA") into several asphalts, as described above. Asphalt flux "A" is derived from a mid-continent (mixed base) crude, while asphalt flux "B" is derived from a gulf coast asphaltic crude. Both fluxes are commercially available. The OPOTA was pre-dried and incorporated into each of "A" and "B", with heating at 400°–450° F. (200°–230° C.), using techniques described above. It should be noted that the OPOTA is hygroscopic and may present mixing deficiencies when used with hot asphalts. Table 1 c shows various asphalts prepared using OPOTA, incorporated into a partially air blown asphalt, and compared to an asphalt prepared with a conventional inert filler material. The performance properties of such materials are also provided. The asphalt compositions of Tables 1a–c have the properties/characteristics of a temperature-stabilized coating grade of roofing asphalt, but it will be understood by those skilled in the art that the principles and concepts presented therein can be readily-extended to asphalt cements/binders meeting the specifications of ASTM D 3381 and/or D 976, usable in conjunction with pavement compositions, or alternatively in conjunction with industrial coatings. Likewise, the data and information of this example and other examples can be extended to include a number of other bitumens such as coal tar and coal tar pitch materials.

TABLE 1a

| | Composition No. | | | | | | | | | |
|---|---|---|---|---|---|---|---|---|---|---|
| | -01 | -02 | -03 | -04 | -05 | -06 | -07 | -08 | -09 | -10 |
| Ingredient (wt. %) | | | | | | | | | | |
| Asphalt Flux "A" | 100 | 52 | 50 | 48 | 46 | — | — | — | — | — |

TABLE 1a-continued

| | Composition No. | | | | | | | | | |
|---|---|---|---|---|---|---|---|---|---|---|
| | -01 | -02 | -03 | -04 | -05 | -06 | -07 | -08 | -09 | -10 |
| OPOTA | — | 48 | 50 | 52 | 54 | — | 48 | 50 | 52 | 54 |
| Asphalt Flux "B" | — | — | — | — | — | 100 | 52 | 50 | 48 | 46 |
| | 100 | 100 | 100 | 100 | 100 | 100 | 100 | 100 | 100 | 100 |
| Property | | | | | | | | | | |
| Softening Point, | | | | | | | | | | |
| °F. | 82 | 200 | 205 | 211 | 228 | 112 | 235 | 247 | 269 | 306 |
| °C. | 27.8 | 93.3 | 96.4 | 99.4 | 108.9 | 44.4 | 112.8 | 119.4 | 131.7 | 152.2 |
| Penetration, dmm | | | | | | | | | | |
| @4° C. | 222+ | 27 | 26 | 22 | 19 | 52 | 12 | 11 | 10 | 5 |
| 25° C. | — | 40 | 38 | 33 | 27 | 106 | 18 | 16 | 12 | 10 |
| Brookfield Visc., cps | | | | | | | | | | |
| @325° F. (162.1° C.) | 39 | 6123 | 9547 | 8880* | 16,867+ | 107 | 37,017 | 59,067* | 196,533* | 1,000,000* |
| 375° F. (190.6° C.) | 20 | 1468 | 1863 | 3522 | 4,723 | 45 | 7,592 | 11,342 | 25,967* | 107,667* |
| 425° F. (218.3° C.) | 12 | 638 | 722 | 1211 | 2,038 | 25 | 2,160 | 4,297 | 5,963 | 88,867* |
| *The product is shear susceptible with greater shear forces significantly increasing the total viscosity. The data point was run at lower shear rate. | | | | | | | | | | |
| Ash, % | .036 | 31.2 | 37.1 | 39.4 | 41.1 | .079 | 30.8 | 31.6 | 33.8 | 35.8 |

As shown above, the oxidation product of this invention provides compositions with a harder asphalt, as exemplified by the unexpected dramatic improvement in softening point, penetration and viscosity parameters. Test methods for softening point and penetration evaluation are found in ASTM standard specifications D 36 and D 5, respectively. The compositions and their performance properties can vary depending on the concentration/quantity of OPOTA and the asphalt source and/or type. Irrespective of the reactivity of OPOTA or the susceptibility of either "A" or "B" to modification, asphalt "B" provided a harder composition with an equal concentration of OPOTA. It should be noted that the compositions with softening points greater than 230° F. (110° C.) (7-10) meet the temperature stability requirements for residential roofing products; i.e. roofing shingles.

TABLE 1b

| | Compsition No. | | | |
|---|---|---|---|---|
| | -01 | -02 | -03 | -04 |
| Ingredient (wt. %) | | | | |
| Asphalt "A" and OPOTA, 50:50, (wt. % wt. %) | 99 | 98 | 100[1] | 97 |
| OPOTA | 1 | 2 | 0 | 3 |
| | 100 | 100 | 100 | 100 |
| Property | | | | |
| Softening Point, °F. (°C.) | 226 (108) | 230 (110) | 207.5 (98) | 234 (112) |
| Penetration @ 25° C., dmm | 23 | 23 | 23 | 23 |
| Brookfield Visc., cps @325° F. (163° C.) | 10,960 | 17,973 | 4,747 | 23,160 |

TABLE 1b-continued

| | Compsition No. | | | |
|---|---|---|---|---|
| | -01 | -02 | -03 | -04 |
| 375° F. (190° C.) | 2,533 | 3,650 | 2,002 | 4,460 |
| 425° F. (218° C.) | 1,057 | 1,343 | 659 | 1,681 |

[1]With reference to Table 1a, Trial #3, above.

The compositions described herein can be further modified by incremental incorporation of additional OPOTA, as shown above with addition to a 50:50 (wt. %/wt. %) composition of asphalt "A" and OPOTA. Using 100 percent of the 50:50 composition as a control, incremental enhancement of beneficial performance properties is as shown in Trials 1, 2 and 4. It is also observed that the incremental effect is related to the amount of OPOTA post-added to a prepared composition. (Refer to Nos. 1,2 and 4). With reference to Composition No. 3, it is observed that reheating and remixing a previously prepared composition did not significantly change the indicated properties. The reaction and/or interaction of OPOTA and/or the reactive solids with asphalt goes to completion and distinguishes the OPOTA and compositions of this invention over the prior art.

TABLE 1c

| | Composition No. | | | | | |
|---|---|---|---|---|---|---|
| | -01A | -01B | -02A | -02B | -03A | -03B |
| Ingredient (wt. %) | | | | | | |
| Air blown | 40 | 40 | 40 | 40 | 40 | 40 |

TABLE 1c-continued

| | Composition No. | | | | | |
|---|---|---|---|---|---|---|
| | -01A | -01B | -02A | -02B | -03A | -03B |
| Asphalt 138 | | | | | | |
| Conventional Filler | 30 | 30 | 20 | 20 | 40 | 40 |
| OPOTA | 30 | — | 40 | — | 20 | — |
| Property | | | | | | |
| Softening Point, °F. | 236.0 | 182 | 294 | 193 | 207.5 | 172 |
| °C. | 113.3 | 83.3 | 145.6 | 89.4 | 97.5 | 77.8 |
| Penetration, dmm | | | | | | |
| @25° C. | 15.0 | 21.7 | 10.0 | 18.8 | 17.7 | 28.2 |
| @4° C. | 11.0 | 14.8 | 6.5 | 13.5 | 12.5 | 17.0 |
| Viscosity, cps | | | | | | |
| @325° F. (163° C.) | — | 3,724 | — | 9,158 | 15,383 | 2,350 |
| @375° F. (191° C.) | 7,887 | 1,025 | 72,233 | 2,717 | 5,525 | 815 |
| @425° F. (218° C.) | 2,850 | 503 | 14,354 | 805 | 1,958 | 447 |

As observed, dilution of the inventive OPOTA component adversely affects the performance properties otherwise observed with the compositions of this invention. The OPOTA of this example and that illustrated elsewhere herein, is available from Pure Air, a division of Air Products and Chemicals, Inc., Allentown, Pennsylvania. The data of Table 1c also show that the inventive compositions can be prepared using partially air blown asphalts and conventional fillers of the type indicated above, having an initial softening point of 138° F. (59° C.).

Example 2

This example shows the effect of OPOTA on an unrefined coal tar and evaluates use of an OPOTA material in conjunction with coal tar air blowing. The unrefined coal tar residue used was a byproduct of low temperature carbonization and prepared by quenching, with water, hot gases from a carbonizer with subsequent separation. The air blowing process examined was of the type typically used to provide a coal tar with sufficient softening point and penetration parameters for use for coal dust briquetting.

The target softening point was 75°–85° C., with a penetration of 3–10 dmm, at 25° C., with minimal material losses during air blowing.

TABLE 2

Effect of OPOTA in Softening Point of Unrefined Coal Tar

| | | Softening Point, °C. | |
|---|---|---|---|
| | | 0% OPOTA | 0.5% OPOTA |
| I. | Air Blowing Time (min) | | |
| | 0 | 42.2 | 42.2 |
| | 60 | 47.2 | 52.4 |

TABLE 2-continued

Effect of OPOTA in Softening Point of Unrefined Coal Tar

| | | Softening Point, °C. | |
|---|---|---|---|
| | | 0% OPOTA | 0.5% OPOTA |
| | 120 | 56.1 | 78.5 |
| | 180 | 65.0 | 82.2 |
| | 240 | 73.1 | — |
| | 300 | 78.9 | — |
| | 310 | 80.3 | — |
| II. | Properties | | |
| A. | Yield (%) | | |
| | Blown Tar | 64.4 | 72.1 |
| | Distillates | 11.5 | 3.8 |
| | Water | 21.6 | 22.4 |
| | | 97.5 | 98.3 |
| | Loss % | 2.5 | 1.7 |
| B. | Penetration (dmm) @25° C. | 0.2 | 1.6 |
| C. | Brookfield Viscosity (cps) | | |
| | @121.4° C. | 2403 | 1980 |
| | @148.9° C. | 263 | 303 |
| | @176.6° C. | 64 | 63 |

As illustrated above and representative of the variety of bitumen base materials which can be utilized, incorporation of the inventive oxidation product favorably modified the physical properties examined and lowered material losses. In particular, incorporation of a minimal amount of this oxidation product significantly raised the observed softening point from that measured after air blowing. From the data accumulated, it would be expected that further improvements would be observed by extending this example to higher OPOTA concentrations, as well as to other bitumen base materials.

Example 3

The compositions of this example are, again, directed more specifically to roofing asphalts, but confirm the general reactivity and/or interactive utility of the inventive OPOTA and/or inorganic solids through direct comparison with neat asphalt and analogous compositions prepared using inert filler materials of the prior art. The features and principles through the data provided in this example apply with similar effect to paving cements and various industrial coatings, irrespective of the bitumen used. With reference to 100 percent asphalt flux (Table 3a), the nearly 120° F. (50° C.) rise in softening point (refer to Table 1a and Composition No. 3, above) for a 50 wt. % OPOTA composition versus a 16° F. (9° C.) rise in softening point for a 50 wt. % inert filler composition (Table 3b)—and about a 30° F. (17° C.) rise with 60 wt. % inert filler (Table 3c)—demonstrates the unexpected properties/benefits attainable through use of the oxidation products.

TABLE 3a

Asphalt flux (100 wt. %)
Mix Conditions: Low speed paddle agitation; 450–475° F.

TABLE 3a-continued (230–250° C.)

Property Assessment:

| | Mix Time, Minutes | |
|---|---|---|
| | 30 | 240 |
| Softening Point, °F. | 92 | 94 |
| (°C.) | (33) | (34) |
| Penetration @ 77° F. (25° C.), dmm | 248 | 232 |
| Brookfield Thermocell Viscosity, cps | | |
| @163° C. | 49 | 55 |
| 190° C. | 24 | 27 |
| 218° C. | 14 | 12 |
| Ash, % | | 0.32 |

TABLE 3b

Asphalt flux and roofing grade filler, 50:50, (wt. %/wt. %)
Mix Conditions: Low speed paddle agitation; 450–475° F. (230–250° C.)

Property Assessment:

| | Mix Time, Minutes | | | | |
|---|---|---|---|---|---|
| | 30 | 60 | 90 | 120 | 240 |
| Softening Point, °F. | 108 | 108 | 106 | 107 | 116 |
| (°C.) | (42) | (42) | (41) | (42) | (46) |
| Penetration @ 77° F. (25° C.), dmm | 180 | 181 | 180 | 171[1] | 151[1] |
| Brookfield Thermocell Viscosity, cps | | | | | |
| @163° C. | 163 | 160 | 160 | 176 | 172 |
| 190° C. | 75 | 74 | 71 | 80 | 80 |
| 218° C. | 41 | 42 | 40 | 43 | 43 |
| Ash, % | | | | | 38.9 |

[1] It is believed a decrease in penetration after long mix times is due to filler mixing and wetting out and, perhaps, secondarily to some expected asphalt property change as might be expected after prolonged exposure to high mix temperatures.

TABLE 3c

Asphalt flux and roofing grade filler, 40:60, (wt. %/wt. %)
Mix Conditions: Low speed paddle agitation; 450–475° F. (230–250° C.)

TABLE 3c-continued

Property Assessment:

| Property | Mix Time, Minutes | | | | |
|---|---|---|---|---|---|
| | 30 | 60 | 90 | 120 | 240 |
| Softening Point, °F. | 119 | 119 | 121 | 122 | 134 |
| (°C.) | (48) | (48) | (49) | (50) | (57) |
| Penetration @ 77° F. (25° C.), dmm | 97 | 95 | 96 | 93 | 46[1] |
| Brookfield Thermocell Viscosity, cps | | | | | |
| @163° C. | 554 | 474 | 475 | 465 | 766 |
| 190° C. | 225 | 203 | 204 | 195 | 310 |
| 218° C. | 109 | 101 | 100 | 99 | 149 |
| Ash, % | | | | | 49.6 |

[1] It is believed a decrease in penetration after long mix times is due to filler mixing and wetting out and, perhaps, secondarily to some expected asphalt property change as might be expected after prolonged exposure to high mix temperatures.

Example 4

As discussed more fully above, paving asphalts can be graded according to their viscosities at 60° and 135° C. Reference is made to ASTM test methods D 2171 and D 2170, respectively, both of which are incorporated by reference herein in their entirety. The data of Table 4a show the effect of OPOTA on two different AC-5 grade paving asphalts, as compared to a collodial (china) clay filler of the prior art. The weight percentages of OPOTA examined in Tables 4a–b are typical of the filler loads currently used. The data of Table 4b shows the effect of OPOTA on representative coating grade roofing asphalt.

Consistent with the general mix and formulation procedures discussed above, the bituminous compositions of Tables 4a and 4b were prepared by paddle agitation to simulate inline solids/liquid blenders. Mix temperatures were 400° F. (205°C.).

TABLE 4a

| Asphalt | Trifinery AC-5 | | | | | Amoco AC-5 | | | | |
|---|---|---|---|---|---|---|---|---|---|---|
| Additive | Blank | Clay | OPOTA | | | Blank | clay | OPOTA | | |
| Dose (wt. %) | 0 | 5 | 1 | 5 | 10 | 0 | 5 | 1 | 5 | 10 |
| Visc @ 60°, P | 632 | 741.7 | 750.3 | 948.8 | 1353.9 | 643.9 | 788.6 | 794.4 | 917.4 | 1453.8 |
| Visc. @ 135°, cSt | 224.8 | 258.9 | 250.7 | 309.5 | 397.1 | 230.2 | 275.1 | 261.8 | 291.4 | 431.3 |
| Pen @ 25°, dmm | 183.3 | 167.7 | 176.3 | 157.3 | 135.3 | 158.3 | 133.3 | 140.7 | 128.3 | 97.3 |
| Flash, COC °F. | 502 | 507 | 522 | 527 | 522 | 552 | 548 | 542 | 537 | 527 |
| (°C.) | (26) | (26) | (27) | (28) | (27) | (29) | (29) | (28) | (28) | (28) |
| Sol. in TCE, % | 99.85 | 95.08 | 99.23 | 96.14 | 91.68 | 99.74 | 94.86 | 99.12 | 96.04 | 91.58 |
| TFOT wt loss | 0.47 | 0.49 | 0.49 | 0.47 | 0.60 | 0.45 | 0.33 | 0.37 | 0.34 | 0.37 |
| Visc. @ 60°, P | 1617.9 | 1876.8 | 2127.5 | 3220 | 3473.8 | 1714.9 | 1885.3 | 1977.7 | 2172.2 | 3973.5 |
| Duct @ 25°, cm | >120 | >120* | 65.7 | 41.7 | 44.8 | >120 | 70.7 | 79.2* | 63.5 | 32.8 |

*Note: Small, undispersed particles of OPOTA were present and may have impacted some test results.

As discussed herein, the penetration, flash point, solubility in TCE, and tests on residue from thin-film oven tests (TFOT) parameters are found in ASTM standard specification D 3381 and the testing methods described therein, all of which are incorporated herein by reference in their entirety. It is seen that under the mix and temperature conditions employed, 5 wt. % OPOTA enhanced the performance parameters of each asphalt, including an increase in viscosity equivalent to about one viscosity grade (AC-10); while incorporation of 10 wt. % OPOTA resulted in an increase of about two viscosity grades (AC-15).

While Table 4a shows use of relatively low concentrations of OPOTA, as suggested for use in the paving context, Table 4b illustrates the utility of higher weight percentages with roofing fluxes and extends the comparison of Table 4a to a conventional coal fly ash filler. All mixes were prepared at 400°–410° F. (200°–210° C.) on the same low shear mixer for about 2 hours.

TABLE 4b

| | | Physical Property Assessment | | |
|---|---|---|---|---|
| | | Softening Pt, °F. (°C.) | Penetration (ASTM D 5), dmm | |
| Additive | wt. % | ASTM D36 | @4° C. | @25° C. |
| None | Control (A) | 109.5 (43.1) | 56.3 | 141.7 |
| OPOTA | 10 | 115.0 (46.1) | 43.0 | 108.3 |
| | 20 | 124.5 (51.4) | 35.6 | 76.0 |
| | 30 | 133.5 (56.4) | 29.7 | 56.3 |
| None | Control (B) | 114.0 (45.5) | 54.0 | 123.7 |
| Coal Fly Ash | 10 | 115.0 (46.1) | 45.7 | 115.3 |
| | 20 | 115.0 (46.1) | 41.0 | 92.7 |
| | 30 | 116.0 (46.7) | 35.3 | 82.7 |
| Ball Clay | 10 | 114.0 (45.5) | 45.7 | 102.3 |
| | 20 | 116.0 (46.7) | 40.3 | 95.7 |
| | 30 | 120.8 (49.3) | 37.3 | 87.3 |

The compositions of Table 4b illustrate the properties imparted to roofing compositions. As fly ash and other inert materials such as ball clay provide no beneficial enhancement of performance properties of this roofing asphalt, no benefit would be expected with paving asphalts or other bitumens.

The asphalt material (Controls A and B, without OPOTA, coal fly ash, or clay components) used to compile the data of Table 4b is compositionally comparable to the non-air blown flux "B" of Example 1, above, and the softening point and penetration trends observed in Table 1 a are continued here through use of lower concentrations of OPOTA. The compositions described in Table 1 a have the properties/characteristics of a roofing asphalt, as do those compositions formulated with OPOTA in a manner consistent with the examples of Table 4b. A slight difference in base properties between Control A and Control B is explained in that while originating from the same source, they were drawn from different lots. The penetrations observed with the coal fly ash are explained by the particulate nature of this filler and needle interference, at the concentrations studied, during the test procedures. The differences between properties observed with coal ash and clay filler is attributable to particulate size, with the coal ash particles being much smaller.

Example 5

The tables and data of this example show, in part, the reactivity and/or interactive utility of the inventive OPOTA with various paving asphalts and illustrate the improvement of several representative performance properties, as can be attained through use of this invention. For this purpose, three chemically different asphalts were selected as representative bitumens and introduced to OPOTA, in accordance with this invention. The Citgo asphalt is a refined Venezuelan crude oil having a viscosity grade of AC-10. The Diamond Shamrock asphalt was refined from a West Texas Intermediate crude oil and used as a control as it has little tendency to oxidize. The third asphalt (AC-10) was obtained from Fina Refining Company and originated from a West Texas Sour crude oil. The later was chosen due to its high sulfur content and susceptibility to oxidative aging.

Mixing times and temperatures were controlled. The complex moduli of the resulting compositions were determined after mixing, after completion of the rolling thin-film oven test (RTFOT) described in the standard ASTM D 2872 procedure, and after a pressure aging vessel (PAV) test, as described in the AASHTO MP1 standard procedure. The RTFOT and PAV procedures are designed to mimic oxidative/aging processes. The RTFOT replicates mix plant conditions and loss of volatile asphalt components, while the PAV test (20 hrs. at 100° C under 300 psi) simulates the cumulative aging/oxidation of a bitumen pavement over a 5–10 year period. Both the ASTM D 2872 and AASHTO PP1 procedures are incorporated herein by reference in their entirety.

The complex modulus, $G^*$(kPa), was determined at the temperatures shown, in accordance with Strategic Highway Research Program (SHRP) procedures for asphalt evaluation. Table 5 shows the effect of pre-dried OPOTA on two of the asphalts of Table 5.

TABLE 5a

| | Complex Modulus, kPa | | | | | | |
|---|---|---|---|---|---|---|---|
| Condition Measuring | As Mixed | | RTFOT | | PAV | | |
| Temp., °C. | 58 | 64 | 58 | 64 | 22 | 25 | 28 |
| Citgo AC-10 + | 1.273 | 0.622 | 2.844 | 1.306 | 2100 | 1410 | 875 |
| 2.5 wt. % OPOTA + | 1.637 | 0.730 | 3.436 | 1.524 | 2282 | 1556 | 1076 |
| 5.0 wt. % OPOTA | 1.692 | 0.841 | 3.763 | 1.772 | 3436 | 2016 | 1437 |
| Diamond Shamrock + | 1.166 | 0.614 | 2.050 | 1.028 | 2319 | 1524 | 947 |
| 2.5 wt. % OPOTA + | 1.327 | 0.677 | 2.495 | 1.207 | 2788 | 2062 | 1440 |
| 5.0 wt.% OPOTA | 1.405 | 0.713 | 2.558 | 1.279 | 2922 | 1982 | 1319 |
| Fina AC-10 + | 1.207 | 0.598 | 2.382 | 1.157 | 3794 | 2484 | 1587 |
| 2.5 wt. % OPOTA + | 1.242 | 0.610 | 2.667 | 1.214 | 4727 | 3485 | 2400 |
| 5.0 wt. % OPOTA | 1.303 | 0.646 | 2.885 | 1.338 | 5934 | 4014 | 2664 |

TABLE 5b

| | Complex Modulus, kPa | | | |
|---|---|---|---|---|
| Condition | As Mixed | | RTFOT | |
| Measuring Temp., °C. | 58 | 64 | 58 | 64 |
| Diamond Shamrock | 1.166 | 0.614 | 2.050 | 1.028 |
| +5% dried OPOTA | 1.428 | 0.727 | 2.932 | 1.458 |
| Fina AC-10 | 1.207 | 0.610 | 2.667 | 1.214 |
| +5% dried OPOTA | 1.634 | 0.777 | 3.472 | 1.525 |

The data in Tables 4a and 4b show an oxidative effect of the OPOTA of this invention on bitumen, with the Fina high-sulfur asphalt exhibiting the most pronounced increase in stiffness after both the induced RTFOT and PAV aging procedures. The increase in stiffness observed immediately after mixing, without induced aging, is a manifestation of the unexpected reactivity and/or interactive utility of the OPOTA.

Example 6

The data and bituminous roofing compositions of this invention complement several previous examples by way of demonstrating the improved storage stability of such compositions (Nos. 1–3), as compared to compositions of the prior art (Nos. 4–5) prepared with conventional roofing grade filler. Asphalt flux "A" is as identified in Example 1 and the filler is ground limestone. The OPOTA was dried prior to use. Conventional mix techniques were employed to provide coating grade asphalts (Nos. 1–3) having the qualities of air blown materials.

TABLE 6

| | Composition No. | | | | |
|---|---|---|---|---|---|
| | -01 | -02 | -03 | -04 | -05 |
| Ingredient (wt. %) | | | | | |
| Asphalt Flux "A" | 60 | 50 | 40 | 50 | 40 |
| Filler | — | — | — | 50 | 60 |
| OPOTA | 40 | 50 | 60 | — | — |
| | 100 | 100 | 100 | 100 | 100 |
| Property Assessment | | | | | |
| AFTER 24 HRS @ 400° F. (205° C.) | | | | | |
| Softening Point/Top, °F. | 149 | 201 | 310 | 108 | 138 |
| (°C.) | (65) | (94) | (154) | (42) | (59) |
| Bottom, °F. | 151 | 201 | 315 | 124 | 141 |
| (°C.) | (66) | (94) | (157) | (51) | (61) |
| Ash/Top, % | 22.4 | 27.6 | 29.7 | 41.4 | 53.4 |
| Bottom, % | 23.9 | 27.7 | 31.4 | 58.8 | 62.7 |
| AFTER 72 HRS @ 400° F. (205° C.) | | | | | |
| Softening Point/Top, °F. | 156 | 215 | 315 | 109 | 134 |
| (°C.) | (69) | (102) | (157) | (43) | (57) |
| Bottom, °F. | 156 | 217 | 324 | 119 | 141 |
| (°C.) | (69) | (103) | (162) | (48) | (61) |
| Ash/Top, % | 22.0 | 27.5 | 30.2 | 34.6 | 51.1 |
| Bottom, % | 23.2 | 31.7 | 32.1 | 57.1 | 60.0 |
| AFTER 168 HRS @ 400° F. (205° C.) | | | | | |
| Softening Point/Top, °F. | 155 | 217 | 313 | 106 | 134 |
| (°C.) | (68) | (103) | (156) | (41) | (57) |
| Bottom, °F. | 159 | 218 | 323 | 154 | 141 |
| (°C.) | (71) | (103) | (162) | (68) | (61) |
| Ash/Top, % | 25.9 | 27.0 | 29.7 | 27.6 | 53.2 |
| Bottom, % | 32.7 | 32.4 | 32.2 | 64.7 | 73.7 |

Roofing compositions such as those described in Table 6 are often stored at elevated (application temperatures ° 400° F., 205° C.), temperatures for periods up to several days. Homogeneity is lost as conventional fillers settle, and various process techniques to address this problem have been unsatisfactory.

The survey summarized in Table 6 shows that coating grades prepared with the OPOTA of the present invention in addition to having the properties (softening point elevation) of air blown asphalts resist settling over prolonged periods under conditions simulating high temperature storage. In contrast, filled coatings of the prior art (Nos. 4–5) are stratified, as evidenced by the divergent softening point parameters as determined by material evaluation from vessel top to bottom and the corresponding ash content (pyrolysis, 24 hours at 1100° F., 590° C.).

It should also be noted that the improvement in performance properties is again demonstrated to be a function of OPOTA concentration. After about 72 hours the softening point was observed to plateau for each OPOTA-treated flux, indicating without limitation on the present invention a stoichiometric and/or proportional aspect to the reactive/ interactive nature of the oxidation product.

Example 7

This example illustrates various bituminous compositions modified with polymer, as described above. The particular compositions examined are of the type usable as roofing binders and show substitution of a conventional filler (ground limestone) with an OPOTA of this invention. The styrene-butadiene-styrene block co-polymer (SBS) used was non-crosslinked and is available from Shell Petroleum. The OPOTA was pre-dried to avoid mixing difficulties with heated asphalt. Conventional mix techniques and conditions (410° F., 210° C.) were employed.

TABLE 7a

| | Compositions | | |
|---|---|---|---|
| | -01 | -02 | -03 |
| Ingredient (wt %) | | | |
| Asphalt-Flux | 82.0 | 82.0 | 82.0 |
| 1101-SBS | 8.0 | 8.0 | 8.0 |
| Roofing Filler | 10.0 | — | 5.0 |
| OPOTA | — | 10.0 | 5.0 |
| | 100.0 | 100.0 | 100.0 |
| PROPERTIES: AS MIXED: | | | |
| Softening Point, F.° (°C.) | 209.8 (98.8) | 206.5 (96.9) | 200.0 (93.5) |
| Penetration, dmm | | | |
| @4° C. | 97.3 | 87.0 | 89.7 |
| @25° C. | 138.0 | 123.7 | 133.0 |
| Viscosity, cps | | | |
| @325° F. (163° C.) | 545 | 656 | 608 |
| @375° F. (191° C.) | 248 | 293 | 273 |
| @425° F. (218° C.) | 134 | 155 | 145 |
| Dynamic Shear Rheology, kPa (G*, I rad/sec) | | | |
| @70° C. | 1.336 | 1.588 | 1.331 |
| @25° C. | 19.66 | 24.60 | 20.32 |
| Creep Stiffness, @ −20° C. | | | |
| Stiffness, kPa | 22,780 | 22,120 | 22,280 |
| m Value | 0.483 | 0.502 | 0.476 |

Several as-mixed properties evaluated are as summarized in Table 7a. Penetrations, viscosity and dynamic shear data indicate the OPOTA stiffens and/or toughens the modified mix when compared to a control using a conventional inert mineral filler. The data also indicates the modification of these properties are somewhat proportionate to the amount of OPOTA incorporated within the mix. It should be noted that the seeming inconsistency between the softening point and creep stiffness data may be explained by the OPOTA co-modified asphalt exhibiting higher viscosities under low frequency shear forces.

TABLE 7b

|  | Compositions | | |
|---|---|---|---|
|  | -01 | -02 | -03 |
| Ingredient (wt %) | | | |
| Asphalt-Flux | 82.0 | 82.0 | 82.0 |
| 1101-SBS | 8.0 | 8.0 | 8.0 |
| Roofing Filler | 10.0 | — | 5.0 |
| OPOTA | — | 10.0 | 5.0 |
|  | 100.0 | 100.0 | 100.0 |
| PROPERTIES: PAV RESIDUE | | | |
| Softening Point, F.° (°C.) | 183.5 (84) | 179.5 (82) | 172.0 (78) |
| Penetration, dmm | | | |
| @4° C. | 64.3 | 53.8 | 63.0 |
| @25° C. | 97.7 | 78.7 | 89.3 |
| Dynamic Shear Rheology, kPa.(G*, I rad/sec) @70° C. | 0.67 | 1.07 | 0.85 |
| Ingredient (wt.%) | 63.15 | 67.15 | 64.13 |
| Creep Stiffness, @ −20° C. | | | |
| Stiffness, kPa | 37,045 | 45,055 | 42,340 |
| m Value | 0.433 | 0.419 | 0.435 |
| Force Ductility @ 10° C. (1 cm/min, to 24 cm) | | | |
| Max. Force, lbs/cm² | 2.3 | 2.65 | 2.25 |
| Elastic Recovery @ 10° C., 1 hr | | | |
| % | 87.9 | 73.7 | 80.3 |

The aging properties of the compositions of this example were evaluated on the basis of the indicated PAV (AASHTO MP1)and RTFOT (ASTM D 2872) tests. Both the ASTM D 2872 and AASHTO PP1 procedures are incorporated herein by reference in their entirety. As shown more fully in Table 7b, the changes in penetration, dynamic shear rheology and creep stiffness are consistent with oxidative aging of the asphalt component. Force ductility also increased upon an incorporation of OPOTA, while elastic recovery decreased proportionately-a behavior analogous to sulfur-vulcanized SBS modified asphalts. Again, while the bituminous compositions of this example were prepared using an asphaltic bitumen base material, comparable effects are observed and the resulting compositions can be used with bitumens otherwise described herein.

Example 8

The compositions of this example show the utility of and beneficial results attainable through use of the present oxidation product in conjunction with a conventional polymeric modifier. The OPOTA facilitates the modification/improvement of numerous performance properties, including those shown below in Table 8. The resulting compositions can be used as binders and/or cements for asphalt pavements. Both the Husky 150–200 and Husky 300–400 components are soft paving grade asphalts commercially available from Husky Oil Operations, Ltd. and were used at the weight percentages shown. Standard paving asphalts modified in this manner typically include about 4 weight percent polymer, but higher concentrations can be used for certain applications. The styrene-butadiene-styrene (SBS) modifiers A and B are commercially available. Examples 03A and 03B illustrate use of a commercial styrene-butadiene rubber (SBR) modifier. The compositions were prepared under low shear mixing conditions for two hours at 350° F. (177° C.).

The creep stiffness measurements taken on the PAV and RTFOT residues show improved aging properties. As can be inferred from several compositions of Table 8, and in particular compositions 03A and 03B, the inventive effect of the OPOTA economically permits reduced polymer concentration, while retaining substantially the same or improved performance levels. Alternatively, the inventive oxidation products can be used with typical polymer concentrations to significantly improve bitumen performance.

TABLE 8

|  | Composition | | | | | | |
|---|---|---|---|---|---|---|---|
|  | -01A | -01B | -01C | -02A | -02B | -03A | -03B |
| Ingredient (wt.%) | | | | | | | |
| Asphalt | | | | | | | |
| Husky 150–200 | 96 | 94.1 | 95.04 | 96 | 94.1 | — | — |
| Husky 300–400 | — | — | — | — | — | 93.0 | 91.14 |
| SBS Polymer | | | | | | | |
| A | 4 | 3.9 | 3.96 | — | — | — | — |
| B | — | — | — | 4 | 3.9 | — | — |
| SBR Polymer | — | — | — | — | — | 7.0 | 6.86 |
| OPOTA | — | 2.0 | 1.0 | — | 2.0 | — | 2.00 |
| Properties | | | | | | | |
| Original Mix | | | | | | | |
| Dynamic Shear, kPa, @ 70° C. (G*/sinδ) | 0.940 | 1.78 | 1.08 | 0.740 | 1.79 | 0.827 | 0.940 |

TABLE 8-continued

| | Composition | | | | | | |
|---|---|---|---|---|---|---|---|
| | -01A | -01B | -01C | -02A | -02B | -03A | -03B |
| Viscosity @ 135° C., cps | 987 | — | 1314 | 703 | — | — | 1526 |
| RTFOT RESIDUE | | | | | | | |
| Mass Loss, % | 0.34 | — | — | 0.23 | — | 0.78 | 0.92 |
| Dynamic Shear, kPa, @ 70° C. (G*/sind) | 1.63 | — | 2.15 | 1.38 | — | 1.42 | 1.44 |
| PAV RESIDUE (100° C./300 psi/20 hrs) | | | | | | | |
| Dynamic Shear, kPa, @ 22° C. (G*/sind) | 1634 | 244 | — | <1600 | 124 | 294 | 321 |
| Creep Stiffness @ −24° C. | | | | | | | |
| Stiffness, S, kPa | 413,300 | 53,513 | 304,650 | 28,593 | — | 98,195 | 106,250 |
| m Value | 0.266 | 0.390 | 0.283 | 0.454 | — | 0.452 | 0.413 |

As illustrated in Table 8, incorporation of OPOTA increased compositional viscosity and stiffness (greater elastic modulus) as mixed, without adversely affecting low temperature properties. The improvements suggest the OPOTA can react/interact with and/or directly modify the bitumen and/or polymer components of the composition. Similar enhancement of the desirable properties are obtained through the incorporation of comparable quantities of OPOTA in other asphalts modified with styrene-butadiene copolymer, ethylene-vinylacetate copolymer, polypropylene, polyethylene, and atactic polyolefins.

While the principles of this invention have been described in connection with specific embodiments, it should be understood clearly that these descriptions, along with the chosen tables and data therein, are made only by way of example and are not intended to limit the scope of this invention, in any manner. For example, the bituminous compositions can be prepared using bitumen base materials originated from sources other than those described above. The performance properties modified are not limited to those disclosed. While numerous SHRP and AASHTO procedures/specifications have been described the properties described have equal applicability to corresponding foreign/international standards, including those of Canada and the European Community. It should be understood that the data presented is only representative of the benefits and advantages which can be realized through the use of such compositions. Likewise, while certain compositions can be prepared with reference to specific process parameters—including temperature and component concentrations—it is understood that such parameters and others inferred from this description can be readily changed for the purpose of optimizing one or more of the various performance properties. For instance, the bituminous compositions described herein can be prepared using either batch or continuous methods. The bituminous compositions are not limited to any specific polymeric system, but can incorporate any previously-used polymer—with due consideration given to molecular weight, blend, structure/morphology, and end use. Other advantages and features of the invention will become apparent from the following claims, with the scope thereof determined by the reasonable equivalents, as understood by those skilled in the art.

What is claimed is:

1. A bituminous composition of enhanced properties comprising:
  (a) from about 0.1 to about 60 percent by weight of a solid residue combustion product from combustion of a naturally occurring asphalt from the Orinoco Belt of Venezuela; and
  (b) from about 3 to about 99.9 percent by weight of bitumen base material.

2. The composition of claim 1 wherein the combustion product is that of an aqueous emulsion of a naturally occurring asphalt from the Orinoco Belt of Venezuela.

3. The composition of claim 1 wherein the bitumen base material also contains a polymer in the amount of at least about 1 percent by weight and up to about 40 percent by weight based upon the bitumen base material and which polymer is selected from the group consisting of elastomers, plastomer and combination thereof.

4. The composition of claim 3 wherein the polymer is a styrene-butadiene-styrene co-polymer, styrene-butadiene co-polymer, styrene-butadiene-rubber co-polymer, ethylene-vinylacetate co-polymer, polypropylene, polyethylene, atactic polyolefin, or a combination thereof.

5. The composition of claim 1 in which the bitumen base material also contains a filler in the amount of at least about 1 percent by weight up to about 80 percent by weight.

6. The composition of claim 5 wherein the filler is at least one of a silicate, a Group IA metal halide, hydroxide, carbonate and sulfate, and a Group IIA metal halide, hydroxide, carbonate and sulfate.

7. The composition of claim 5 wherein a polymer is also present in an amount of at least about 1 percent by weight up to about 40 percent by weight.

8. The composition of claim 1 admixed with an aggregate present in the amount of from about 85 to about 97 percent by weight based upon the total admixture weight.

9. The admixture of claim 8 in which the bitumen base material of claim 1 also contains form about 0.1 to about 50 per cent by weight of a paving additive.

10. The composition of claim 3 admixed with an aggregate present in the amount of from about 85 to about 97 percent by weight based upon the total admixture weight.

11. The admixture of claim 10 wherein the aggregate is present in the amount of form about 92 to about 96 percent by weight based upon the total admixture weight.

12. The admixture of claim 10 wherein the aggregate is present in the amount of from 88 to about 94 percent by weight based upon the total admixture weight.

13. The admixture of claim 10 wherein the polymer is an elastomer present in the bitumen base material in the range of from about 1 to about 5 percent by weight.

14. The admixture of claim 10 wherein the polymer is a plastomer present in the bitumen base material in the range of from about 3 to about 40 percent by weight.

15. The admixture of claim 14 wherein the polymer is a plastomer present in the bitumen base material in the range of from about 5 to about 25 percent by weight.

16. The admixture of claim 10 wherein the polymer is a combination of a plastomer and an elastomer, and the elastomer is present in the range of from about 0.1 to about 3 percent by weight and the plastomer is present in the range of from about 1 to about 10 percent by weight both based upon the bitumen base material.

17. The admixture of claim 13 wherein the elastomer is a styrene butadiene co-polymer.

18. The admixture of claim 13 wherein the elastomer is selected from the group consisting of a styrene-butadiene-styrene co-polymer and a styrene-butadiene-rubber co-polymer.

19. The admixture of claim 10 in which the composition of claim 3 also contains from about 0.1 to about 50 per cent by weight of a paving additive.

20. The composition of claim 1 wherein the combustion product is present in the range of from about 2.5 to about 15 percent by weight.

21. The composition of claim 3 wherein the combustion product is present in the range of from about 2.5 to about 15 percent by weight.

22. The composition of claim 3 wherein the combustion product is present in the range of from about 0.1 to about 5 percent by weight.

23. The composition of claim 1 wherein the combustion product is present in the range of from about 20 to about 60 percent by weight.

24. The composition of claim 3 wherein the combustion product is present in the range of from about 20 to about 60 percent by weight.

25. The composition of claim 3 wherein the polymer is an elastomer present in the range of from about 5 to about 15 percent by weight and the combustion product is present in the range of from about 20 to about 40 percent by weight.

26. The composition of claim 3 wherein the polymer is a plastomer present in the range of from about 5 to about 40 percent by weight and the combustion product is present in the range of from about 20 to about 40 percent by weight.

27. The composition of claim 5 wherein the filler is present in the range of from about 1 to about 20 percent by weight and the combustion product is present in the range of from about 25 to about 55 percent by weight.

28. The composition of claim 27 wherein the combustion product and filler comprise from about 15 to about 70 percent by weight of the total composition.

29. The composition of claim 28 wherein the combustion product and filler comprise from about 15 to about 30 percent by weight of the total composition.

30. The composition of claim 27 wherein the combustion of product and filler comprise from about 50 to about 70 percent by weight of the total composition.

31. The process for the production of the composition of claim 1 which comprises admixing the combustion product with the bitumen base material at a temperature in the range of from about 40° F. to about 850° F.

32. The process of claim 31 in which a filler in an amount of at least about 1 percent by weight is admixed with the bitumen base material.

33. The process of claim 31 in which a polymer in an amount of at least about 1 percent by weight is admixed with the bitumen base material at a temperature less than about 450° F.

34. The process of claim 31 in which both a polymer and a filler are admixed with the bitumen base material and the bitumen and a polymer are admixed, and then the combustion product is admixed thereto, and then the filler is sequentially admixed admixed at a temperature less than about 450° F.

35. The process of claim 31 in which the bitumen base material is converted to a fluid form prior to the admixing.

36. The process of claim 35 in which the bitumen is converted to a fluid by mixing with a solvent for the bitumen base material.

37. The process of claim 35 in which the bitumen is converted to a fluid by forming an emulsion of the bitumen with water.

38. The process of claim 35 in which the bitumen is converted to a fluid by heating to a temperature in the range of from about 200° F. to about 850° F. and is maintained in such range until the mixing is completed.

39. The process of claim 38 in which the combustion product is present in the range of from about 0.2 to about 60 percent by weight and is incorporated into the bitumen base material at a temperature in the range of from about 300° F. to about 500° F.

40. The process of claim 38 in which the combustion product is present in the range of from about 2.5 to about 12 percent by weight and is incorporated into the bitumen base material at a temperature in the range of from about 300° F. to about 450° F.

41. The process of claim 36 in which the combustion product is present in the range of from about 1 to about 40 percent by weight and is incorporated into the bitumen base material at a temperature in the range of from about ambient to about 160° F.

42. The process of claim 36 in which the combustion product is present in the range of from about 1 to about 20 percent by weight and is incorporated into the bitumen base material at a temperature in the range of from about ambient to about 140° F.

43. The process of claim 37 in which the combustion product present in the range of from about 1 to about 40 percent by weight and is incorporated into the bitumen base material at a temperature in the range of from about ambient to about 200° F.

44. The process of claim 37 in which the combustion product is present in the range of from about 1 to about 20 percent by weight and is incorporated into the bitumen base material at a temperature in the range of from about ambient to about 140° F.

45. The process of claim 32 in which the combustion product is combined with filler and the combined combustion product and filler is admixed with the bitumen base material.

46. The process of claim 31 in which the combustion product is combined with an aggregate and the combined combustion product and aggregate is admixed with the bitumen base material.

* * * * *